(12) United States Patent
Arend et al.

(10) Patent No.: US 7,113,941 B2
(45) Date of Patent: Sep. 26, 2006

(54) DATABASE ACCESS MECHANISMS FOR A COMPUTER USER INTERFACE

(75) Inventors: Udo Arend, Heidelberg (DE); Heinz Willumeit, Leimen (DE); Edmund Eberleh, St. Leon-Rot (DE)

(73) Assignee: SAP Aktiengesellschaft, Walldorf (DE)

( * ) Notice: Subject to any disclaimer, the term of this patent is extended or adjusted under 35 U.S.C. 154(b) by 443 days.

(21) Appl. No.: 10/256,968

(22) Filed: Sep. 27, 2002

(65) Prior Publication Data

US 2003/0229631 A1    Dec. 11, 2003

Related U.S. Application Data

(60) Provisional application No. 60/386,393, filed on Jun. 5, 2002.

(51) Int. Cl.
*G06F 7/00* (2006.01)
*G06F 3/00* (2006.01)

(52) U.S. Cl. ............................... 707/3; 707/6; 715/854
(58) Field of Classification Search ................ 715/854; 707/100, 3, 6; 709/246, 203, 218; 379/88.04
See application file for complete search history.

(56) References Cited

U.S. PATENT DOCUMENTS

| | | |
|---|---|---|
| 5,737,591 A | 4/1998 | Kaplan et al. |
| 5,963,938 A | 10/1999 | Wilson et al. |
| 6,185,588 B1 | 2/2001 | Olson-Williams et al. |
| 6,466,241 B1 | 10/2002 | Schindler |
| 6,501,832 B1 * | 12/2002 | Saylor et al. ............ 379/88.04 |
| 6,643,661 B1 * | 11/2003 | Polizzi et al. ............... 707/100 |

FOREIGN PATENT DOCUMENTS

| | | |
|---|---|---|
| GB | 2363044 | 12/2001 |
| WO | 01/13266 | 2/2001 |
| WO | 02/103576 | 12/2002 |

OTHER PUBLICATIONS

Description of the "recently used file list" in Microsoft Word, printed from the "Help" menu.
Description of the AutoReport function in Microsoft Access, printed from the "Help" menu.
http://www.sap.info/public/en/article.php4/comvArticle-193333c63b489e3d93/en, "Product management business scenario", Nov. 24, 1999 3 pages printed from web site Jan. 15, 2004.
Neibauer, "Part V—Bending Folders to Your Will," *Running Microsoft Outlook 2000* (*The Complete Reference Made by Microsoft to Help You Be More Productive*), 1999, Microsoft Press, Redmond, WA, pp. 470-478.

* cited by examiner

*Primary Examiner*—Uyen Le
*Assistant Examiner*—Susan Chen
(74) *Attorney, Agent, or Firm*—Fish & Richardson P.C.

(57) ABSTRACT

The disclosure relates to providing access to database objects. A first view displays first and second database access mechanisms. The first database access mechanism includes at least one database access pattern including a predefined search of the database. The second database access mechanism includes at least one selection function and an input function, for searching a selected subset of the database for objects having an input value. The second database access mechanism is also capable of adding a database access pattern to the first database access mechanism. A third database access mechanism comprises an attribute choice and an input field to search for database objects having the input value associated with a chosen attribute.

25 Claims, 9 Drawing Sheets

DATABASE ACCESS MECHANISMS FOR A COMPUTER USER INTERFACE

CROSS REFERENCE TO RELATED APPLICATIONS

This application claims priority from U.S. Provisional Application No. 60/386,393, filed Jun. 5, 2002, and titled "User Interface with Object Identification Area," which is incorporated by reference in its entirety.

TECHNICAL FIELD

The invention relates to computer user interface implementations of database access mechanisms.

BACKGROUND

There are different examples of providing access to database objects by searching for, identifying, and presenting database objects to a user on a display device of a computer system. One example is when a user selects an object field from a list of object field choices for the search to operate on, and enters a text string to be compared with the respective data value in the corresponding field of the database objects. The result of this search is a collection of database objects having the string in the selected object field.

If the desired field is not available as a choice in the list of field choices for the database search, the user may not be able to identify the desired set of database objects. For example, searching for the presence of the chosen string in any field of the database objects may produce a search result with too many hits to be practically useful. Moreover, if the user desires a database search on multiple object fields, the option of choosing a single search field may be unsuitable.

Some search mechanisms present a user with a search window capable of searching for strings in more than one field at a time. If the search window is a secondary window, distinct from a primary window, some or all of the primary window may be obscured by the secondary window. Additionally, each time a user wishes to repeat a given search, the user may be required to reenter the search parameters in a search window. This may force the user to memorize each of the search parameters and reenter them each time the search is required, which is inconvenient and time consuming.

SUMMARY

The invention provides various database access mechanisms that enable users to quickly and efficiently select an appropriate database access mechanism to search for, identify, and present a desired set of database objects. In one general aspect, the invention provides for the display of a first view having a first database access mechanism on a display device. The first database access mechanism has at least one database access pattern that includes a predefined search of the database. Additionally, the first view includes a second database access mechanism having at least one selection function for selecting a subset of the database to access and an input function. The second database access mechanism may be capable of receiving an input to select a subset of the database, receiving at least one input value in the input function, and searching the subset of the database for database objects having the input value. The second database access mechanism may also be capable of adding a database access pattern to the first database access mechanism. An input is received to select a database access mechanism and the database is searched using the selected database access mechanism. A second view having a set of one or more database objects identified by the database search is displayed on the display device.

In addition to the first and second database access mechanisms, the first view may further include a third database access mechanism having at least one attribute choice and an input field. The third database access mechanism may be capable of receiving an input to select an attribute, receiving an input value in the input field, and searching the database for database objects having the input value associated with the selected attribute.

An initial database search using a "My Favorites" database access pattern may be performed on the database prior to displaying the first view. In this case, the first view may include a set of database objects identified by the initial database search. The first database access mechanism may include a database access pattern defined by a user.

A database access pattern of the first database access mechanism may include one or more search criterion, where each search criterion has a condition on an object attribute. As another example, a database access pattern of the first database access mechanism may retrieve a collection of database objects defined by a user.

The second database access mechanism may be capable of removing a database access pattern from the first database access mechanism. The selection function of the second database access mechanism may include a containment function for selecting the subset of the database to access, and a configuration function for selecting the parameters of the input function of the second database access mechanism. The input function of the second database access mechanism may include a plurality of input fields corresponding to database object fields. A temporary communication area may be displayed within the first view after receiving the input to select a database access mechanism. The temporary communication area may include a work area for utilizing the second database access mechanism.

Advantages of the invention may include one or more of the following. A new level of database search convenience and functionality is possible. For example, a computer system incorporating the invention to search a database is, in some respects, more flexible, and as such, may be able to provide more efficient database searches than a computer system lacking the invention. Allowing a user to define new database access patterns that are quickly selectable from a database access mechanism eliminates the tedious task of reentering search criteria each time the desired search is required. An initial database search executed upon application launch provides meaningful database content at the outset without any input from a user. Offering three powerful database access mechanisms displayed together increases a user's ability to conveniently and effectively locate objects in a database.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
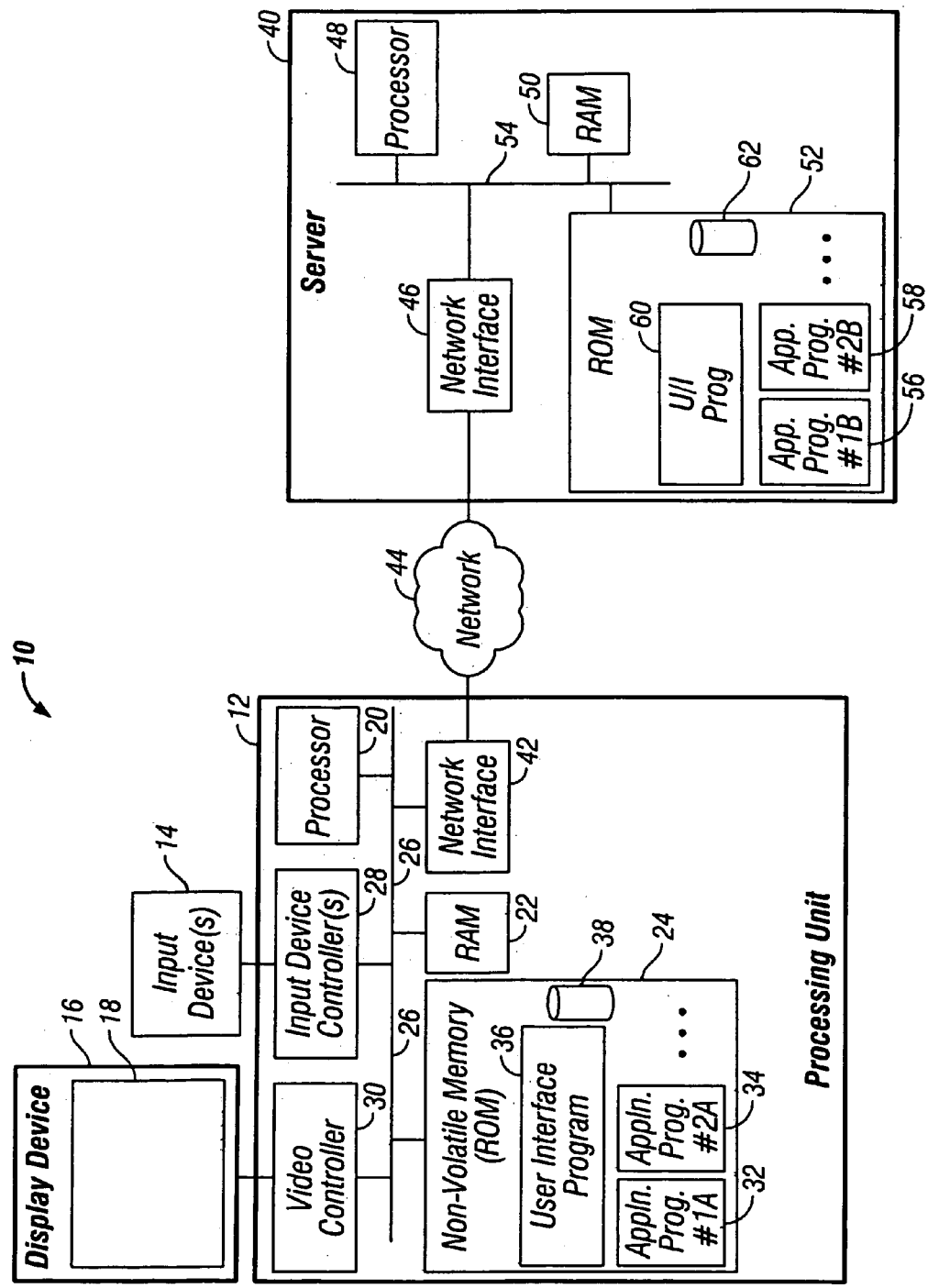
FIG. 1 is a block diagram of a system that may utilize aspects of the invention.

A computer system 10, shown in FIG. 1, includes a processing unit 12, one or more input devices 14, and a display device 16 upon which a user is presented displays in accordance with the invention. The display device 16 has a video screen 18 upon which displays appear.

As is conventional, the processing unit 12 includes a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18. The computer system 10 is not limited to a personal computer, but could instead include a personal digital assistant, a terminal, a workstation, or other such device.

ROM 24, as is conventional, provides non-volatile data storage for various application programs. In the example shown in FIG. 1, a number of different application programs 32, 34, etc., are stored in ROM 24. Also stored in ROM 24 is a user interface program 36 designed to work in concert with each of the application programs 32, 34, etc. This is conceptually depicted in FIG. 1 by the user interface program 36 being shown as a layer on top of the application programs 32, 34, etc. With such a design, user interface program modules common to several application programs need not be duplicated in each of the application programs. In addition, such a design may enable a common "look-and-feel" to the user interface for the different program applications 32, 34, etc. In other implementations, the user interface program, or module, need not be a common program or module for more than one program application. Also, the components just described could be combined or separated in various manners, and could be stored in various manners, such as on various non-volatile storage medium.

As is conventional, programs 32, 34, and 36 have program instructions that may be loaded into RAM 22 during operation. Processor 20 then executes the program instructions, as required, to perform desired program functions.

Also stored in ROM 24 are various data in database 38. Database 38 includes data needed or generated during operation of the application programs 32, 34, etc. In the FIG. 1 implementation, a single database 38 is shown that serves as a common database for all applications 32, 34, etc. In other implementations, there may be separate databases for one, or more, of the applications 32, 34, etc.

Also shown in FIG. 1 is server 40. The computer system 10 has a network interface 42, connected to its data bus 26. As such, computer system 10 may access server 40 via network 44 to run applications residing on the server 40. Network 44 may be, for example, a LAN, WAN, or the Internet. As is conventional, the server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, etc., as well as a common user interface program 60 for the application programs 56, 58, etc. ROM 52, in this example, also includes data stored in database 62, although in other implementations separate databases or a separate database server may be required.

The invention will be described in the context of a program application for customer relationship management (CRM). A CRM program application manages the interactions a company may have with its customers, for example, marketing, sales, and service functions. In one implementation, the CRM application program is made up of several different application program modules, some of which reside on a client computer, such as system 10, while others reside on a central server, such as server 40. CRM functions typically require access to, and generate, a large amount of data that is stored in various databases on a client or server. The data can include customer and product information, marketing statistics, and service information, to give just a few examples.

Figure 2:
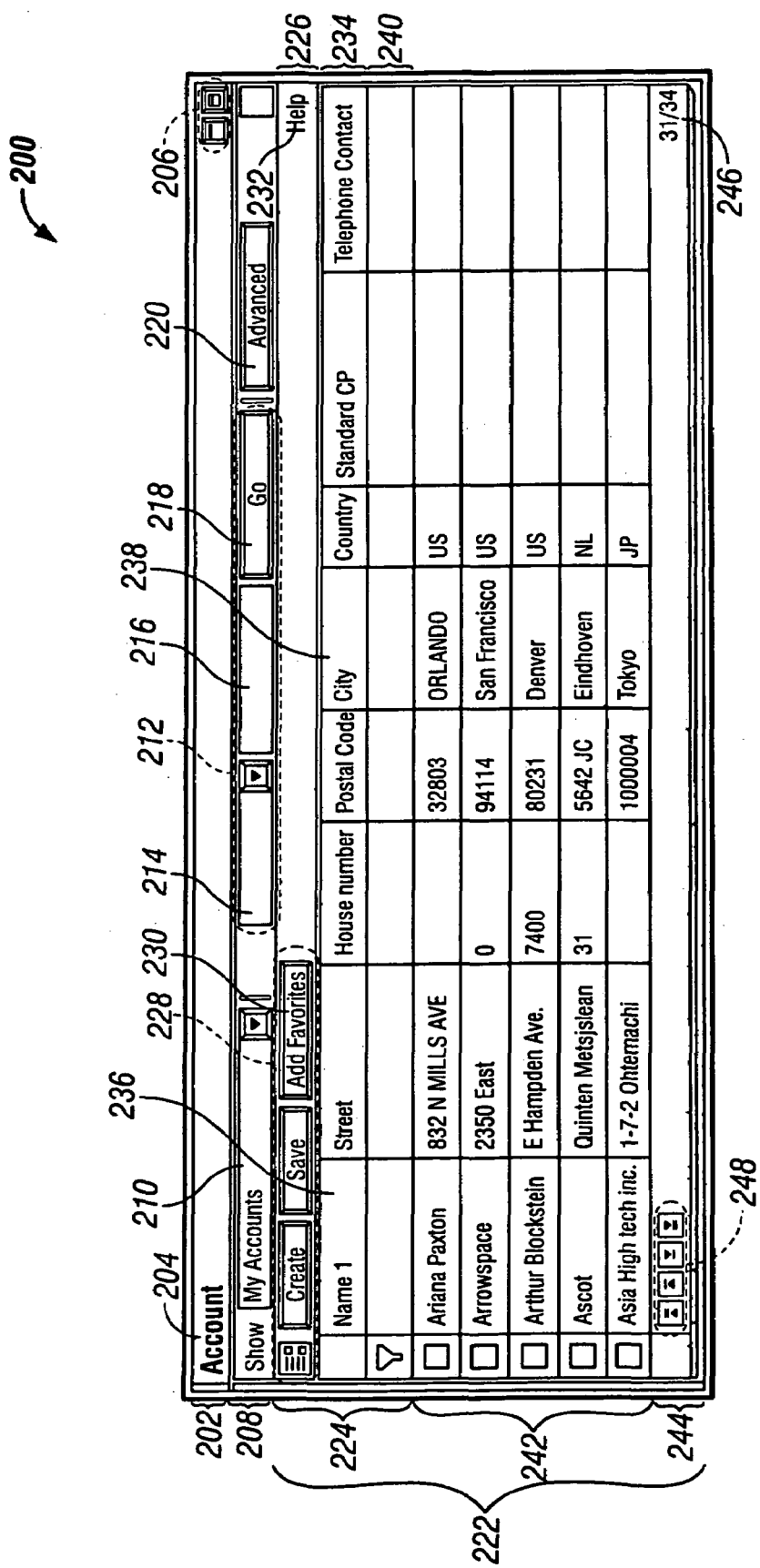
FIGS. 2–4 are screen snapshots of a computer display in accordance with an embodiment of the invention.

FIG. 2 shows an example display 200 that may be presented, on screen 18 shown in FIG. 1, to a user of a CRM application program. In the FIG. 2 example, the user is using the program to view information on various business accounts. Generally, display 200 allows a user to define and select search criteria for searching a database, such as database 62 (FIG. 1), for database objects that may be presented in a table 242 of objects following the execution of the database search. An object is a collection of data, organized as a group of attributes (also called fields) where each field may contain information pertaining to the object. Objects may be stored in a database, such as database 62, for access by users via networked computer systems, such as computer system 10.

Display 200 is comprised of a title row 202, a search bar 208, and a results area 222. A title row 202 is located along an upper edge of display 200. The title row 202 contains a display title 204 ("Account") near its left side, informing the user that display 200 contains information on business accounts, in this example. A pair of size-adjust buttons 206, near the right side of the title row 202, allow a user to change the size of display area 200, for example, by minimizing or maximizing display 200.

A search bar 208, located below the title row 202, provides database access mechanisms, or search mechanisms, that a user may use to search for, and identify, objects stored in a database, such as database 62. A first search mechanism 210, located near the left side of the search bar 208, is a "Show" mechanism containing a drop-down list with a selection of database access patterns, or search patterns, for retrieving collections of database objects. The Show mechanism 210, in the FIG. 2 example, contains a "MY ACCOUNTS" search pattern, which causes a database search seeking those accounts for which the user has personal responsibility.

Figure 5:
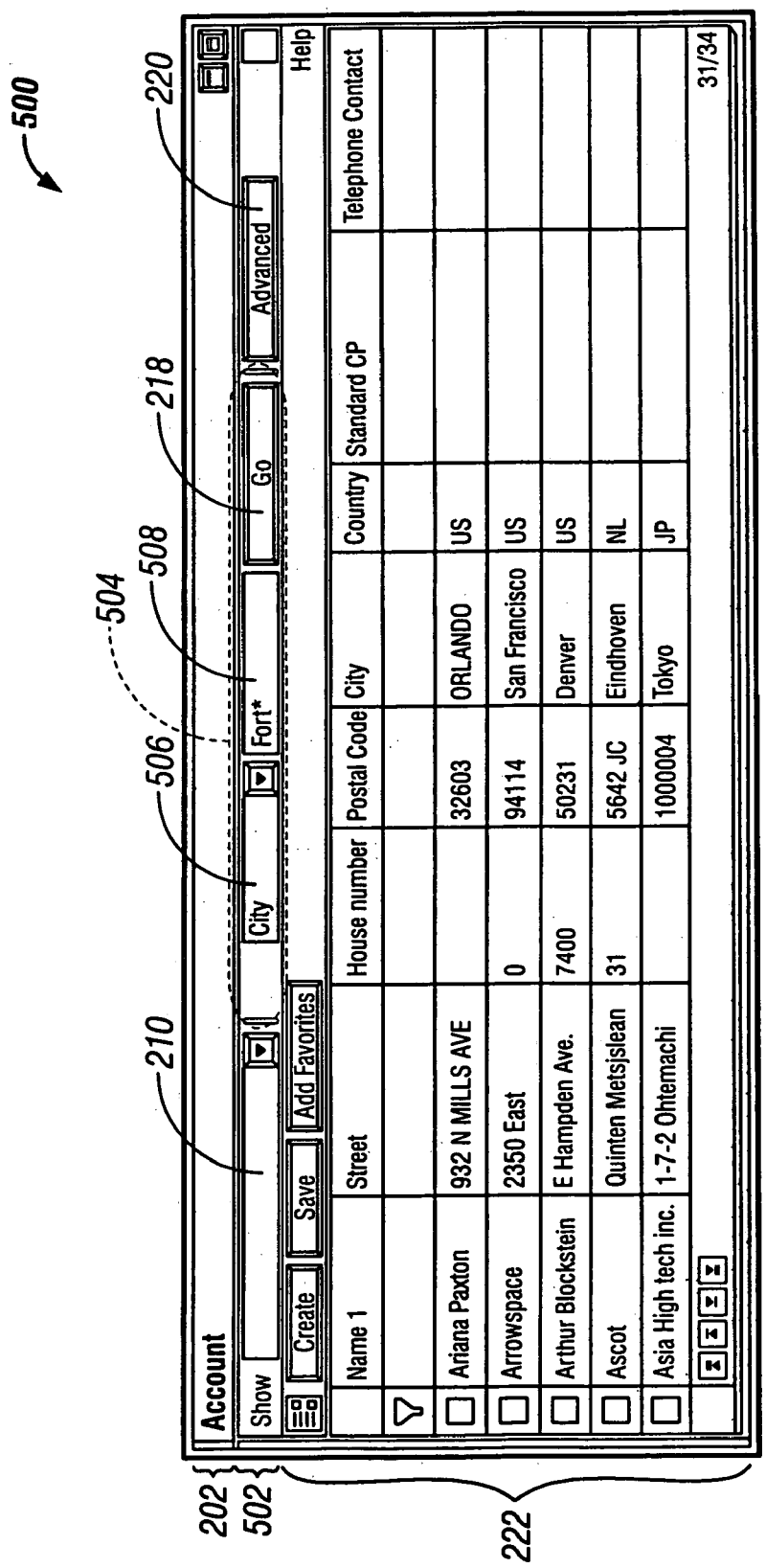
FIGS. 5–6 are screen snapshots of a computer display in accordance with another embodiment of the invention.
Figure 6:
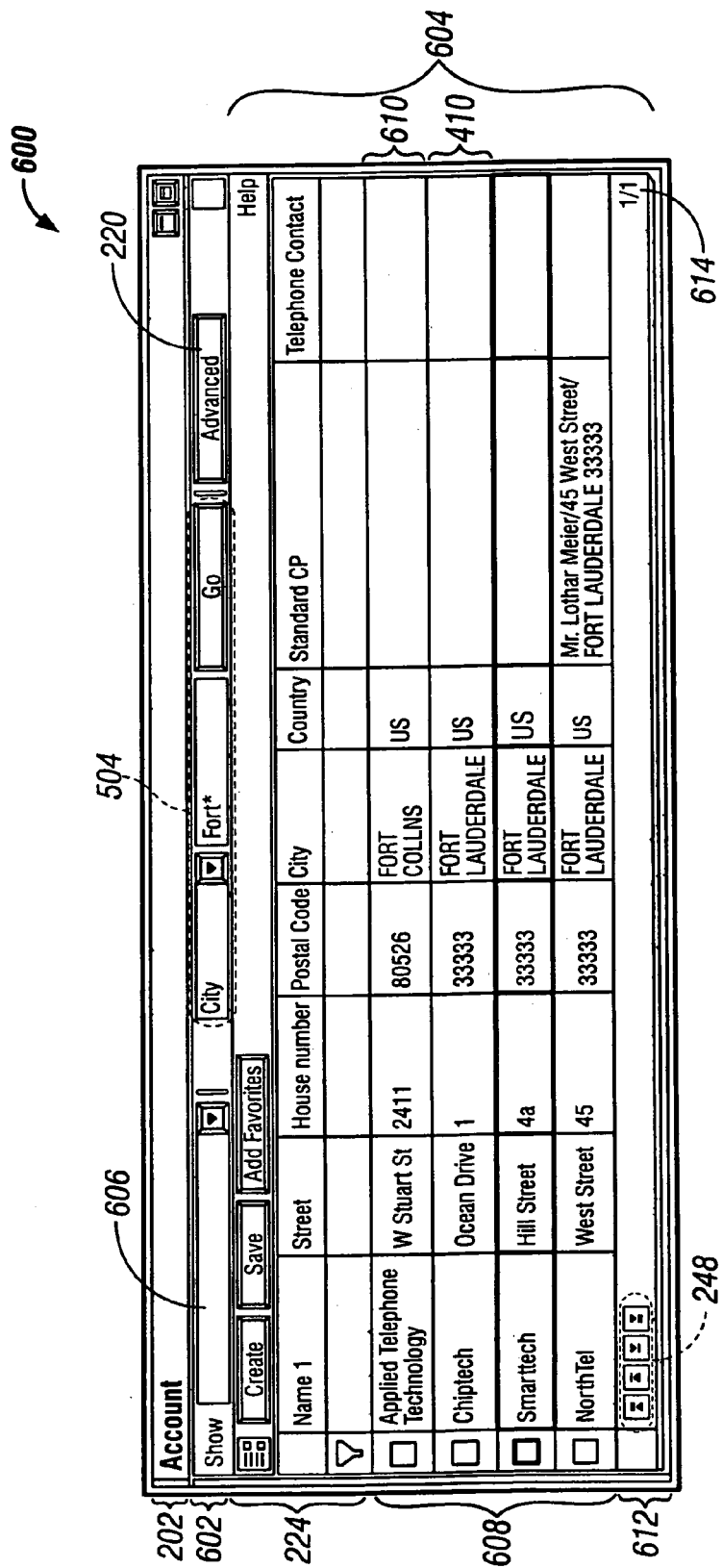

A second search mechanism 212, positioned to the right of the Show mechanism 210, is a search tool having three parts: 1) a "Get" list box 214 for choosing a field label, 2) a string entry field 216 for providing a search string, and 3) a "Go" button 218 for initiating a database search. After choosing a field label from the Get list box 214 and providing a search string in the string entry field 216, a user may select the Go button 218 to initiate a database search for objects having the entered search string in the selected field. An example highlighting the operation of the search tool 212 is shown in FIGS. 5–6, and will be described later. A third mechanism 220 is an "Advanced" search button, positioned to the right of the Go button 218, which allows a user to define advanced search criteria in an advanced search area. This is the mechanism that a user may use if neither the first nor the second search mechanisms 210, 212 meet the user's needs.

Figure 3:
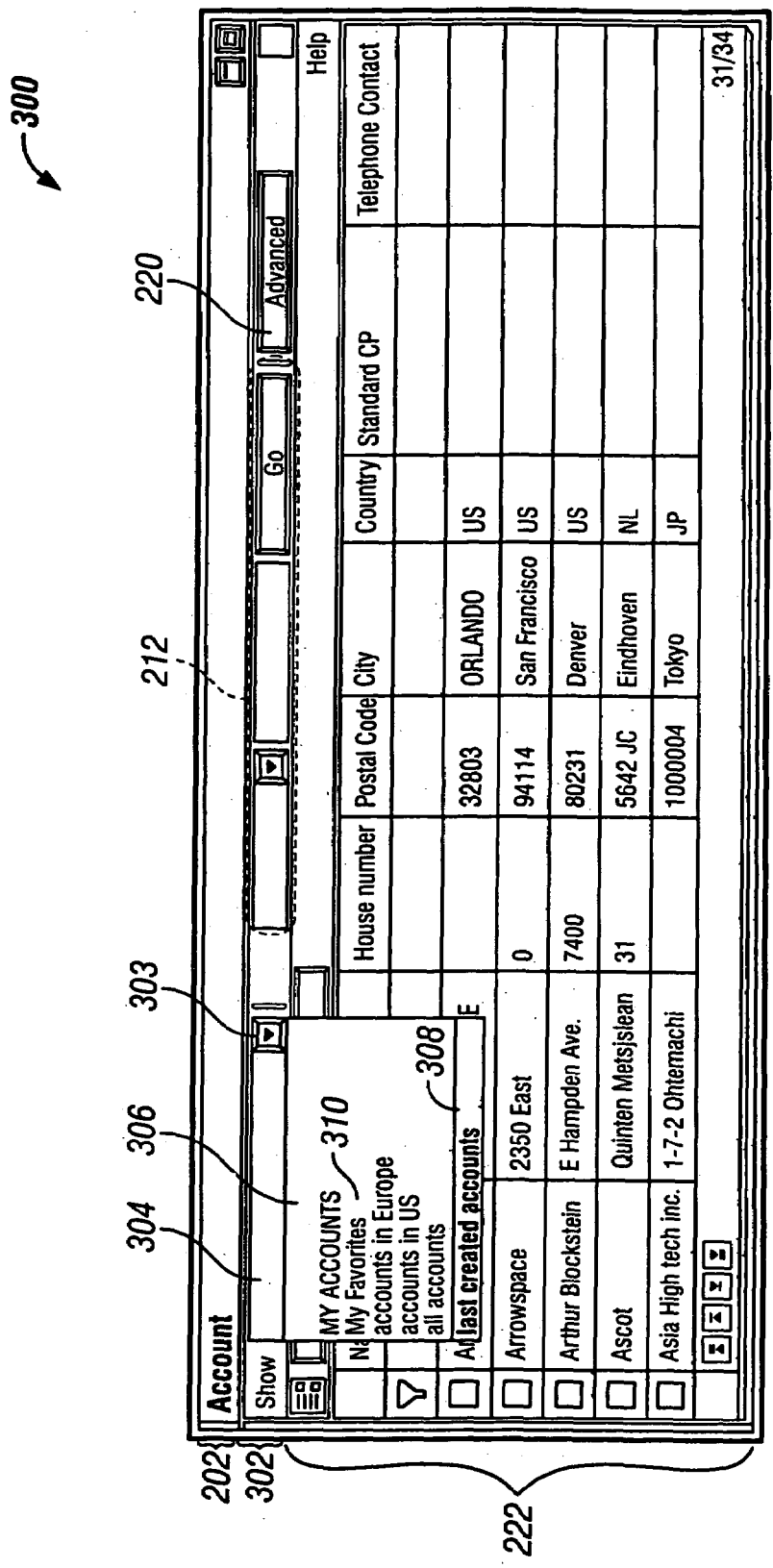

Suppose that, instead of viewing the accounts for which he or she is responsible, a user is interested in viewing the most recently created accounts. A new database search may be required, and may be initiated using one of the search mechanisms 210, 212, 220. FIG. 3 shows a display 300 where a "last created accounts" search pattern 308 is selected from a Show list 306. FIG. 3 will be discussed later.

Referring again to FIG. 2, a results area 222, located below the search bar 208, provides a user with the results of the database search in a table 242 of objects, as well as object-related functionality in a functional area 224. Beginning with the functional area 224, at the top of results area 222, there is a toolbar 226, a column label row 234, and a filter row 240. The toolbar 226 contains a "Help" icon 232 near its right side, and a group of action buttons 228 near its left side. The "Help" icon 232, as is conventional, provides the user with assistance when selected. A first action button 230, labeled "Add Favorites," allows a user to add a selected object to a collection of favorite objects and will be further described later. The remaining buttons in the group of action buttons 228 cause actions to occur that affect the table 242 of objects. Examples include displaying a single selected object's fields of information, creating a new object, and saving changes made to an object. The toolbar 226 may contain other (including a different number of) buttons in other embodiments.

A column label row 234, located below the toolbar 226, provides labels identifying field names for each of the columns in the table 242 of objects. The column labels in this example are "Name 1" 236, the name of the business account; "Street," the business's street address; "House number," the business's house number, if applicable; "Postal Code," the business's zip code; "City" 238, the city in which the business is located; "Country," the country in which the business is located; "Standard CP," the relevant contact person; and "Telephone Contact," the contact person's telephone number. A filter row 240, located below the column label row 234, is partitioned into sections corresponding to the columns of the table 242 below. The filter row 240 allows a user to filter the table 242 of objects by sorting the objects according to one or more conditions, and displaying only those objects that satisfy the condition(s).

The table 242 of objects in FIG. 2 displays each object as a row. The table 242 is located below the filter row 240 and, in this example, five objects are shown (although, as will be described below, table 242 consists of thirty-four pages with only the thirty-first page shown in FIG. 2). The columns of table 242 correspond to the fields of the objects, identified by the respective label in the column label row 234. The table 242 is created using objects identified by a database search initiated by one of the three search mechanisms from the search bar 208, described above (the Show mechanism 210 in this example).

An information row 244 for the table 242 of business objects, located along the bottom of display 200, contains a page number indicator 246 near its right side (page 31 of 34 in this example, indicating that there are thirty-four pages of business objects in table 242, and that page thirty-one is currently displayed). A group of buttons 248 for navigating between pages, for example by going backward or forward by one page, or by jumping to the first or last page, is located near the left side of the information row 244.

The FIG. 3 display 300 presents the unchanged title row 202 and results area 222 (each described above) from FIG. 2, and a search bar 302. In the FIG. 3 example, a user has selected a drop-down list button 303 from Show mechanism 304, producing a drop-down list 306 presenting six database search patterns. The search patterns in this example are "MY ACCOUNTS," discussed previously; "My Favorites" 310, described below; "accounts in Europe," a pattern to find Europe-based accounts; "accounts in US," a pattern to find American accounts; "all accounts," a pattern to find all business accounts; and "last created accounts" 308, the relevant search pattern in this example.

The My Favorites selection 310 specifies a manually defined collection of objects, and will be discussed later. In contrast to the My Favorites pattern 310, the other five search patterns specify previously defined query criteria for searching a database, such as database 62 (FIG. 1). When one of these search patterns is selected, the database is searched for objects having field data satisfying the query criteria. An advanced search area 706, shown in FIG. 7 and further described later, allows a user to define search pattern query criteria and add or remove search patterns from the Show list 306. The ensuing database objects are then presented in a results area below. The search tool 212 and Advanced button 220 appear unchanged from the FIG. 2 display 200.

Figure 4:
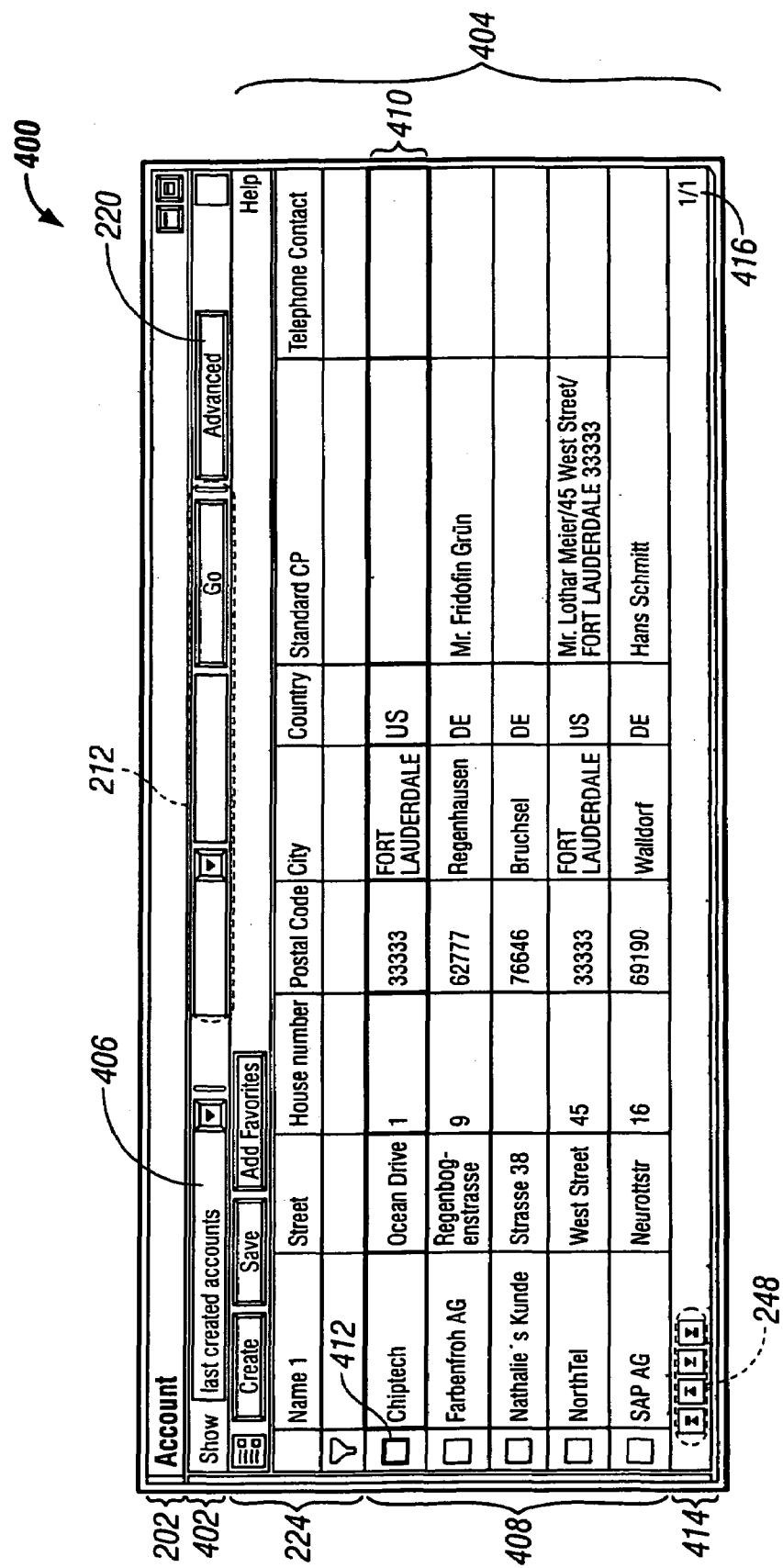

Because the "last created accounts" search pattern 308 is selected from the drop-down list 306 in this example, database 62 (FIG. 1) will be searched for objects created within some previously determined time frame (the last week, for example). Note that in the FIG. 3 display 300, the search has not yet occurred, so the objects displayed in results area 222 match those displayed in display 200 (FIG. 2). FIG. 4 shows the resulting display 400, following the database search.

The FIG. 4 display 400 shows an updated search bar 402 and results area 404, following a database search initiated from display 300 (FIG. 3). Title row 202 (described above) appears unchanged. The search bar 402, below the title row 202, contains a Show mechanism 406 with the "last created accounts" search pattern, selected in display 300 (FIG. 3). Search tool 212 and Advanced button 220, to the right of Show mechanism 406, are unchanged from the FIG. 2 display 200.

A results area 404, below the search bar 402, contains the unchanged functional area 224 (described above) from FIG. 2, and a table 408 of most recently created account objects, below the functional area 224. Table 408 presents five objects, each retrieved from database 62 according to the "last created accounts" search pattern from Show mechanism 406. Object 410 (Chiptech) is selected, as indicated by a highlighted selection icon 412 near the left edge of the object 410. The other objects in the table 408 are "Farbenfroh AG," "Nathalie's Kunde," "NorthTel," and "SAP AG." An information row 414, along the bottom of results area 404, contains a page number indicator 416 near its right edge (page 1 of 1 in this example). The group of buttons 248 for navigating between pages, near the left edge of the information row 414, appears unchanged from the FIG. 2 display 200 and is as described above.

Returning to the FIG. 3 display 300, if My Favorites 310 is selected from the Show drop-down list 306, a database search occurs to identify a collection of objects for retrieval from the database. The collection of objects has been previously manually defined. Results area 222 would then be updated with a new table presenting the collection of objects. A user may add an object to the "My Favorites" collection of objects at any time by selecting an object (for example, by selecting the object's selection icon) from results area 222, and selecting the Add Favorites button 230, shown in FIG. 2 (hidden by the drop-down list 306 in FIG. 3). When the new table of "My Favorite" objects is presented, a "Delete Favorites" button replaces the Add Favorites button 230, permitting the user to remove a selected object from the collection.

The "My Favorites" collection of objects allows a user to define a custom set of objects that need not share any common characteristic. This may be useful, for example, when working with a certain group of objects not collectively covered by any of the available search patterns in the Show list 306. As another example, a user may assign frequently-used objects to the "My Favorites" collection, thereby defining a database access pattern allowing convenient and efficient access to the desired set of database objects. In some embodiments, a database search utilizing the "My Favorites" search pattern 310 is executed initially when an application is launched, such that a user has meaningful results initially available in a results area 222. The user could then work with one of the objects in the "My Favorites" collection, or could initiate a new database search using one of the three available database access mechanisms 304, 212, or 220.

Consider an example where a user wishes to view all accounts having a "City" field entry beginning with "Fort." Perhaps the user is interested in a particular account, but cannot remember anything about it, other than that the business is located in either Fort Lauderdale, Fla., or Fort Collins, Colo. Taking display 200 (FIG. 2) to be the initial screen for this example, the user may select a "City" field from the Get list box 214, and enter "Fort*" in the string entry field 216. The asterisk character ("*") is a wild card character, allowing the substitution of any combination of characters in its place. FIG. 5 shows the resulting display 500.

The FIG. 5 display 500 presents the unchanged title row 202 and results area 222 (both described above) from display 200 (FIG. 2), and an updated search bar 502. The search bar 502 contains the unchanged Show mechanism 210 from display 200 (FIG. 2), still containing the "MY ACCOUNTS" search pattern corresponding to the objects in the results area 222 below. Advanced button 220 is also unchanged from display 200.

A search tool 504, between the Show mechanism 210 and Advanced button 220, includes an updated Get list box 506 and string entry field 508, and the unchanged Go button 218. The Get list box 506 contains a "City" field selection, selected by the user from a drop-down list of choices summoned by the selection of the list selection icon near the right side of the Get list box 506. The string entry field 508 contains the user-entered string "Fort*." In the FIG. 5 example, the user has not yet selected the Go button 218 to initiate a database search. FIG. 6 presents the resulting display 600, following the selection of the Go button 218.

The FIG. 6 display 600 presents an updated search bar 602 and results area 604, and the unchanged title row 202. Because results area 604 no longer presents results according to a Show mechanism 606 search pattern, search bar 602 contains an empty Show mechanism 606. When the search tool Go button 218 (FIG. 5) is selected, the Show mechanism 210 is automatically cleared by the user interface. Referring again to FIG. 6, the search tool 504 and Advanced button 220 appear unchanged from display 500 (FIG. 5).

A results area 604, below the search bar 602, presents the unchanged functional area 224 (FIG. 2), and an updated table 608 of objects, below the functional area 224. Table 608 contains four objects, each having City field entries beginning with "FORT." Object 410 (Chiptech, located in Fort Lauderdale) is shown, along with object 610 (Applied Telephone Technology, located in Fort Collins). The other two object names are Smarttech and NorthTel, each based in Fort Lauderdale. Thus, it is seen that all objects representing businesses located in cities beginning with "Fort" have been identified and displayed in display 600. The user may now locate the desired account. Referring again to FIG. 6, an information row 612 contains a page number indicator 614 near its right side, and the unchanged page navigation buttons 248 near its left side.

Figure 7:
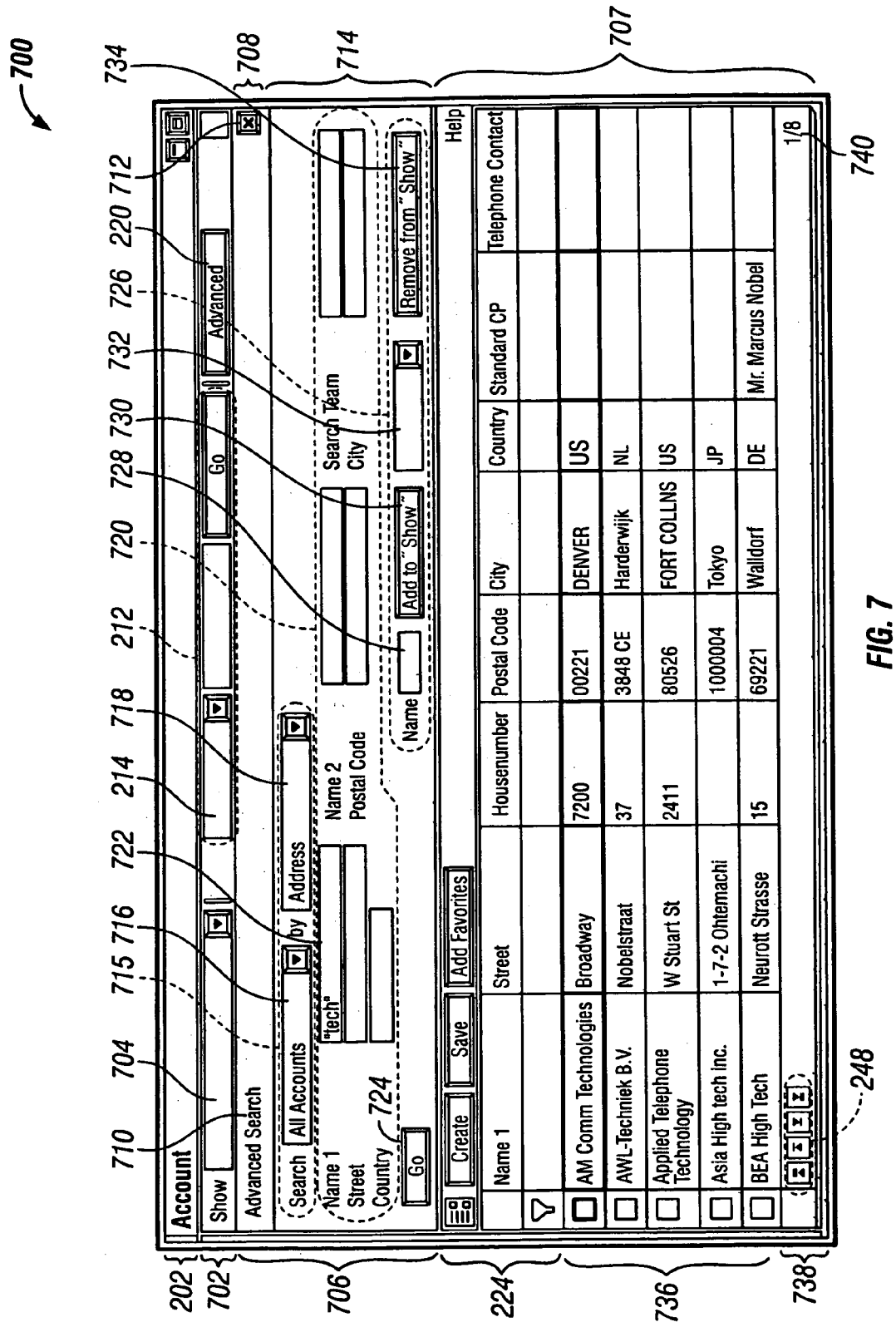
FIG. 7 is a screen snapshot of a computer display in accordance with another embodiment of the invention.

Consider, as another example, a user interested in all accounts having the letters "tech" somewhere in the account name. With display 200 (FIG. 2) as the initial display in this example, a user might initiate a database search by choosing a "Name 1" field from the Get list box 214 (assuming this field choice is present in the list), entering the string "*tech*" in string entry field 216, and selecting the Go button 218. Suppose now that field "Name 1" is not available as a choice in the Get list box 214. This may occur, for example, when the desired field ("Name 1" in this example) is not one of the predefined choices for the Get list box 214. Suppose further, for this example, that the available Show mechanism 210 search patterns are unsuitable. The user could alternatively select the Advanced search button 220, and proceed to define a new search pattern. FIG. 7 shows the resulting display 700, following the selection of the Advanced search button 220 (display 700 shows the results following a new database search using the Advanced search feature, as will be explained below).

The FIG. 7 display 700 presents the unchanged title row 202 along the top of display 700. A search bar 702, below the title row 202, contains an empty Show mechanism 704 and search tool 212, along with the Advanced search button 220. The Show mechanism 704 and search tool 212 are empty because a results area 707 below presents results according to a database search initiated from an advanced search area 706, not from mechanisms 704, 212.

An advanced search area 706, below the search bar 702, allows a user to create and define new search patterns for inclusion in the Show mechanism 704 list, as well as initiate database searches. Additionally, unneeded Show search patterns may be deleted. Beginning at the top of the advanced search area 706, a title row 708 is shown. The title row 708 contains a title 710 ("Advanced Search") near its left side, and a close button 712 near its right side. The close button 712 closes the advanced search area 706 when selected.

An advanced search area body 714, below the title row 708, provides a work area for defining database searches and adding or removing search patterns from the Show list 704. A selection area 715, in the upper left corner of the advanced search area body 714, contains a pair of selection functions 716, 718 for selecting which object fields may be used to define a database search pattern. A "Search" list box 716 provides a list of choices for narrowing the universe of objects to be searched. In the FIG. 7 example, "All Accounts" is selected in the Search list box 716, indicating the database search pattern will apply to all account objects. Other Search list box 716 choices might include "active accounts," "my accounts," or "deleted accounts," to give just a few examples. A "by" selection list box 718, to the right of the Search list box 716, provides a list of choices that determine which object fields appear in a search specification area 720. In the FIG. 7 example, "Address" is selected in the by list box 718, causing address-related object fields to be presented in the search specification area 720.

A specification area 720, below the selection area 715, provides input functionality by presenting a collection of search definition fields corresponding to the selections in the list boxes 716, 718. In the FIG. 7 example, the available input fields are "Name 1" 722, "Name 2," "Search Term," "Street," "Postal Code," "City," and "Country." The Name 1 field 722 contains the entry "*tech*," indicating a user wishes to identify all accounts having "tech" in the Name 1 field, in this example. In another example, other fields may have search conditions, or the collection of search definition fields may be different. Multiple field search conditions are also possible. The advanced search area 706 provides a user with more search definition choices than either the Show mechanism 704, or the search tool 212, allowing a user to define a customized database search. This may be useful, for example, when a desired object field is not available in the Get list box 214, the search patterns in the Show mechanism 704 are not sufficient, or when several search conditions should be used to sufficiently focus the database search.

A "Go" button 724, in the lower left corner of the advanced search area body 714, initiates a database search using the criteria in the search specification area 720, when selected. In the FIG. 7 example, a user has selected the Go button 724, as indicated by an updated results area 707 presenting a table 736 of objects, each having the letters "tech" in the Name 1 field.

The results area 707, below the advanced search area 706, contains the unchanged functional area 224 (described above) from display 200 (FIG. 2), and an updated table 736 of objects. The table 736 of objects shows five objects (although, as will be explained below, table 736 totally consists of eight pages). The shown objects in table 736 are "AM Comm Technologies," "AWL-Techniek B.V.," "Applied Telephone Technology," "Asia High tech inc.," and "BEA High Tech." Thus, it is seen that the database search initiated by the selection of the Go button 724 from advanced search area 706 produces a resulting table 736 of objects satisfying the search criteria (the letters "tech" in the Name 1 field). An information row 738, below the table 736 of objects, provides a page number indicator 740 (page 1 of 8, in this example, indicating that table 736 consists of eight pages, with only the first page shown in display 700), near its right edge. The unchanged page navigation buttons 248 from display 200 (FIG. 2) appear near the left edge of the information row 738.

Suppose, now, that a user anticipates having to work with this set of objects (including any newly added objects satisfying the search criteria) many times over the next several months. The user may create a new search pattern for the Show mechanism 704 for this purpose. Thereafter, the user may simply select the search pattern from the Show mechanism 704 list, without having to reconstruct the pattern in the advanced search area 706.

A Show search pattern control area 726, in the lower right corner of the advanced search area body 714, provides control functionality allowing a user to add or remove search patterns to (from) the Show mechanism 704 list box. A "Name" input field 728 allows a user to specify a name for the new search pattern by entering a text string. Selecting an "Add to 'Show'" button 730 causes the search criteria defined in the specification area 720 to be added to the Show mechanism 704 list with the name in field 728. For example, after entering appropriate search criteria ("*tech*" in the Name 1 field 722 in this example) in specification area 720, a user could enter "Names containing 'tech'" in the Name field 728 and select the Add to "Show" button 730. Thereafter, a "Names containing 'tech'" search pattern will appear as a choice in the Show mechanism 704 list, permitting quick access to the desired set of objects.

A search pattern list box 732, to the right of the "Add to 'Show'" button 730, contains a list of the Show mechanism search patterns. A user may select a search pattern from the box 732 and remove it from the Show mechanism 704 list by selecting a "Remove from 'Show'" button 734, to the right of the box 732. Thus, it is seen that the advanced search area 706 conveniently facilitates the addition (removal) of search patterns to (from) the Show mechanism 704. This coupling between the Show search mechanism 704 and the advanced search mechanism provides a powerful combination of quick access via defined patterns in the Show mechanism 704, and complex search formulation and search pattern definition in the advanced search area 706, with the ability to thereafter quickly select the same search pattern from the Show mechanism 704. The combination of the Show mechanism 704, search tool 212, and advanced search area 714, collectively displayed in the FIG. 7 display 700, provides a user the flexibility to select the appropriate search mechanism, the convenience of easily switching between search mechanisms, and the potency of a powerful set of database access mechanisms.

Figure 8:
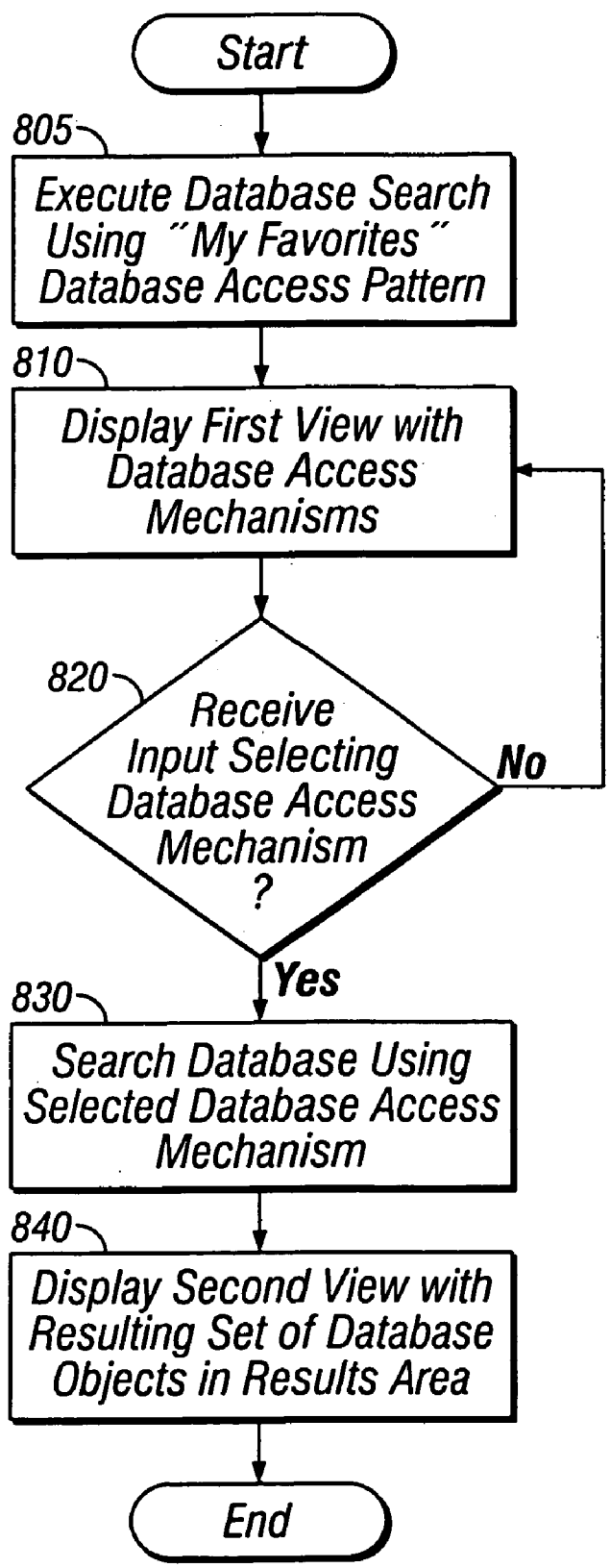
FIGS. 8–9 are flowcharts illustrating examples of how the user interface software application shown in FIG. 1 may operate.

Referring to the exemplary flowchart of FIG. 8, the process performed by a processor executing instructions from a user interface program begins, at step 805, with the execution of a database search using the "My Favorites" database access pattern. This ensures that a user will have access to meaningful content in a results area when the application is launched. Next, at step 810, the display of a first view, on screen 18 (FIG. 1), having database access mechanisms and a results area containing objects identified in the database search of step 805 occurs. In some embodiments, step 805 may be omitted, in which case a results area displayed at step 810 may not contain objects identified using the "My Favorites" access pattern.

Next, at step 820, the process determines whether an input selecting a database access mechanism has been received. Examples of user inputs that may be received to select a database access mechanism might include the click of a mouse button (for example, to select a database access pattern, see FIG. 3), the typing of a key or sequence of keys on a keyboard (for example, to enter a search string, see FIG. 5), a voice-activated command input, the touch of a touchpad screen, etc., or any combination thereof. As was described above with regard to FIG. 7, the selection of a database access mechanism, such as the Advanced mechanism 220, may result in the display of a modified first view. In the absence of such a received input, the first view will continue to be displayed (step 810).

The database search is performed in step 830 using the selected database access mechanism. Then, a second view with the resulting set of database objects in a results area is displayed, at step 840, and the process ends. Examples of views displaying objects in a results area are shown in FIGS. 4,6. The advanced search mechanism may be useful for specifying new database search patterns when either the Show mechanism or the search tool are expected to, or turn out to, be insufficient. Additionally, search patterns may be added to the Show mechanism from the advanced search area.

Figure 9:
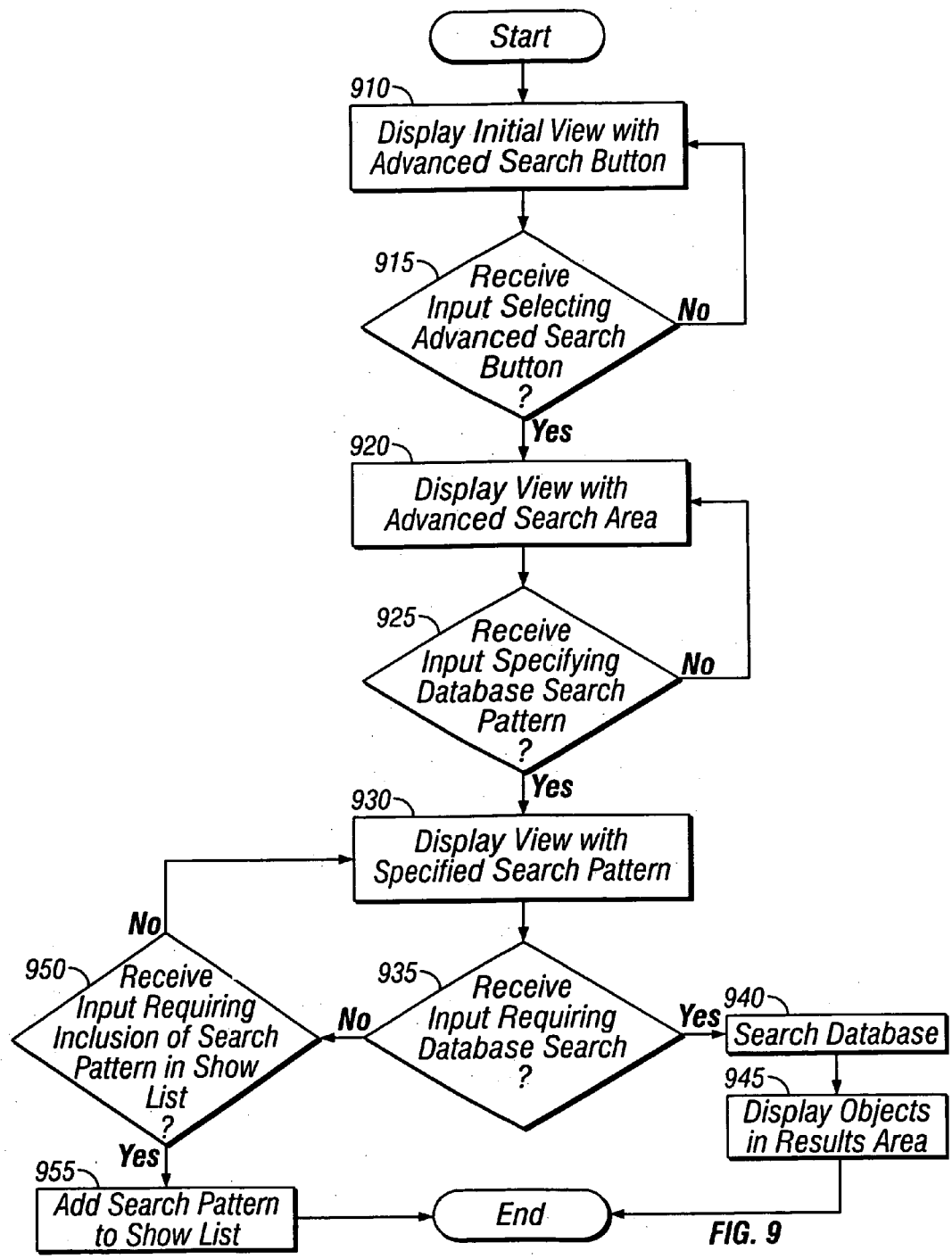

The flowchart of FIG. 9 shows an example of how a user interface may operate to present additional functionality in an advanced search area. The process performed by a processor executing instructions from a user interface program begins, at step 910, with the display of an initial view having an advanced search button on screen 18 (FIG. 1). An example of a view having an advanced search button 220 is shown in FIG. 2. The FIG. 2 view also includes the Show mechanism 210 and the search tool 212 as has been described above. In the FIG. 9 example, a user may have determined, perhaps by operating them, that these two database access mechanisms 210, 212 are not sufficient for the user's needs. Accordingly, the user may turn to the Advanced mechanism 220.

Referring again to FIG. 9, the receipt of an input selecting the advanced search button, at step 915, prompts the display of a view having an advanced search area in step 920. An example of a view having an advanced search area 706 is shown in FIG. 7. In the absence of such a received input, the initial view will continue to be displayed (step 910).

Next, the receipt of an input specifying a database search pattern, at step 925, prompts the display of a view with the specified search pattern at step 930. In the absence of such a received input, the display with the advanced search area will continue to be displayed (step 920). The receipt of an input requiring that a database search be executed, at step 935, prompts a database search using the specified search pattern at step 940. Thereafter, the resultant set of database objects is displayed in a results area at step 945 and the process ends. An example of a view displaying objects in a results area 707 is shown in FIG. 7.

In the absence of a received input requiring a database search at step 935, a received input requiring the inclusion of the specified search pattern in the Show list, at step 950, prompts the addition of the specified search pattern to the Show list at step 955 and the process ends. FIG. 3 shows an example of a Show list 306. In the absence of a received input requiring the inclusion of the specified search pattern in the Show list at step 950, the display with the specified search pattern will continue to be displayed (at step 930).

A number of embodiments of the invention have been described. Nevertheless, it will be understood that various modifications may be made without departing from the spirit and scope of the invention. For example, the various views may display data using a variety of formats and arrangements, and may display one or multiple objects in any particular view. Accordingly, other embodiments are within the scope of the following claims.

What is claimed is:

1. A method of providing access to database objects in computer system, the method comprising:
   displaying a first view on a display device, the first view including:
      a first database access mechanism comprising at least one database access pattern, the database access pattern including a predefined search of the database; and
      a second database access mechanism comprising at least one selection function for selecting a subset of the database to access and an input function, the second database access mechanism capable of receiving an input to select a subset of the database, receiving at least one input value in the input function, and searching the subset of the database for database objects having the input value, the second database access mechanism also being capable of adding a database access pattern to the first database access mechanism;
   receiving an input to select a database access mechanism;
   searching the database using the selected database access mechanism; and
   displaying a second view on the display device, the second view comprising a set of one or more database objects, the set identified by the database search.

2. The method of claim 1 wherein the first view further includes a third database access mechanism, the third database access mechanism comprising at least one attribute choice and an input field, the third database access mechanism capable of receiving an input to select an attribute, receiving an input value in the input field, and searching the database for database objects having the input value associated with the selected attribute.

3. The method of claim 1 wherein the second database access mechanism is capable of removing a database access pattern from the first database access mechanism.

4. The method of claim 1 wherein the first database access mechanism comprises a database access pattern defined by a user.

5. The method of claim 1 wherein a database access pattern of the first database access mechanism comprises a collection of database objects defined by a user.

6. The method of claim 1 wherein a database access pattern of the first database access mechanism comprises one or more search criterion, each search criterion comprised of a condition on an object attribute.

7. The method of claim 1 wherein the selection function of the second database access mechanism further comprises a containment function for selecting the subset of the database to access, and a configuration function for selecting the parameters of the input function of the second database access mechanism.

8. The method of claim 1 wherein the input function of the second database access mechanism further comprises a plurality of input fields corresponding to database object fields.

9. The method of claim 1 further comprising, displaying a temporary communication area within the first view after receiving the input to select a database access mechanism, the temporary communication area comprising a work area for utilizing the second database access mechanism.

10. The method of claim 1 further comprising, performing an initial database search on the database using a database access pattern, the initial database search occurring prior to displaying the first view.

11. The method of claim 10 wherein the database access pattern used for the initial database search is a "My Favorites" database access pattern.

12. The method of claim 10 wherein the first view further includes a set of database objects, the set identified by the initial database search.

13. A method of providing access to database objects in a computer system, the method comprising:
   displaying a first view on a display device, the first view including:
      a first database access mechanism comprising at least one database access pattern, the database access pattern including a predefined search of the database;
      a second database access mechanism comprising at least one selection function for selecting a subset of the database to access and an input function, the second database access mechanism capable of receiving an input to select a subset of the database, receiving at least one input value in the input function, and searching the subset of the database for database objects having the input value, the second database access mechanism also being capable of adding a database access pattern to the first database access mechanism; and a third database access mechanism, the third database access mechanism comprising at least one attribute choice and an input field, the third database access mechanism capable of receiving an input to select an attribute, receiving an input value in the input field, and searching the database for database objects having the input value associated with the selected attribute;

receiving an input to select a database access mechanism;

searching the database using the selected database access mechanism; and displaying a second view on the display device, the second view comprising a set of one or more database objects, the set identified by the database search.

14. Computer-readable medium with program instructions stored thereon that when executed perform the following functions for providing access to database objects in a computer system:

displays a first view on a display device, the first view including:

a first database access mechanism comprising at least one database access pattern, the database access pattern including a predefined search of the database; and a second database access mechanism comprising at least one selection function for selecting a subset of the database to access and an input function, the second database access mechanism capable of receiving an input to select a subset of the database, receiving at least one input value in the input function, and searching the subset of the database for database objects having the input value, the second database access mechanism also being capable of adding a database access pattern to the first database access mechanism;

receives an input to select a database access mechanism;

searches the database using the selected database access mechanism; and displays a second view on the display device, the second view comprising a set of one or more database objects, the set identified by the database search.

15. The medium of claim 14 wherein the first view further includes a third database access mechanism, the third database access mechanism comprising at least one attribute choice and an input field, the third database access mechanism capable of receiving an input to select an attribute, receiving an input value in the input field, and searching the database for database objects having the input value associated with the selected attribute.

16. The medium of claim 14 wherein the second database access mechanism is capable of removing a database access pattern from the first database access mechanism.

17. The medium of claim 14 wherein the first database access mechanism comprises a database access pattern defined by a user.

18. The medium of claim 14 wherein a database access pattern of the first database access mechanism comprises a collection of database objects defined by a user.

19. The medium of claim 14 wherein a database access pattern of the first database access mechanism comprises one or more search criterion, each search criterion comprised of a condition on an object attribute.

20. The medium of claim 14 wherein the selection function of the second database access mechanism further comprises a containment function for selecting the subset of the database to access, and a configuration function for selecting the parameters of the input function of the second database access mechanism.

21. The medium of claim 14 wherein the input function of the second database access mechanism further comprises a plurality of input fields corresponding to database object fields.

22. The medium of claim 14 further comprising, instructions that when executed display a temporary communication area within the first view after receiving the input to select a database access mechanism, the temporary communication area comprising a work area for utilizing the second database access mechanism.

23. The medium of claim 14 further comprising, instructions that when executed perform an initial database search on the database using a database access pattern, the initial database search occurring prior to displaying the first view.

24. The medium of claim 23 wherein the database access pattern used for the initial database search is a "My Favorites" database access pattern.

25. The medium of claim 23 wherein the first view further includes a set of database objects, the set identified by the initial database search.

* * * * *